United States Patent [19]

Bechtle et al.

[11] 4,068,224
[45] Jan. 10, 1978

[54] COMPRESSED INFORMATION STORAGE FOR CHARACTERS CONSISTING OF BLACK AND WHITE AREAS WHICH ARE TO BE DISPLAYED OR PRINTED

[75] Inventors: Bastian Bechtle, Stuttgart-Degerloch; Hartmut J. Bleher, Nurtingen; Helmut Hasselmeier, Aidlingen; Wilhelm G. Spruth; Peter Stucki, both of Boeblingen; Helmut Weis, Waldenbuch, all of Germany

[73] Assignee: International Business Machines Corporation, Armonk, N.Y.

[21] Appl. No.: 632,336

[22] Filed: Nov. 17, 1975

[30] Foreign Application Priority Data

Dec. 19, 1974 Germany .......................... 2460147

[51] Int. Cl.² .............................................. G06F 3/14
[52] U.S. Cl. ................................ 340/324 AD; 178/30
[58] Field of Search ................. 178/DIG. 3, DIG. 6, 178/30; 340/324 AD, 336; 358/133, 138

[56] References Cited

U.S. PATENT DOCUMENTS

| 3,471,848 | 10/1969 | Manber | 340/324 AD |
| 3,480,943 | 11/1969 | Manber | 340/324 AD |
| 3,568,178 | 3/1971 | Day | 340/324 AD |
| 3,863,247 | 1/1975 | Hosokawa | 340/336 |
| 3,868,672 | 2/1975 | Johnson | 340/324 AD |

Primary Examiner—Marshall M. Curtis
Attorney, Agent, or Firm—Owen L. Lamb; Otto Schmid, Jr.

[57] ABSTRACT

Alphanumeric characters are stored in compressed form by creating a character list of information describing each character. The character is divided into rows and columns. To reconstruct the character, a position register is provided to accommodate successive positional values in a column where a transition from white/black (or vice versa) occurs. A decoder circuit, which has a number of outputs corresponding to the number of positional values possible, is coupled to the position register and provides an output associated with each of the transition values. The decoder circuit is followed by control means which is operable in response to the energized outputs of the decoder circuit to generate control signals which energize a utilization device to reconstruct continuous black areas in a column extending from transition value to transition value.

5 Claims, 4 Drawing Figures

| | E | |
|---|---|---|
| a | 15 | – LIST LENGTH |
| b | 3 | – REPETITION FACTOR |
| c | * | – SEPARATION SIGN |
| d | 2 | – REPETITION FACTOR |
| e | Y2 | – ORDINATE OF TRANSITION |
| f | Y18 | – " " " |
| g | * | – SEPARATION SIGN |
| h | 6 | – REPETITION FACTOR |
| i | Y2 | – ORDINATE OF TRANSITION |
| j | Y4 | – " " " |
| k | Y9 | – " " " |
| l | Y11 | – " " " |
| m | Y16 | – " " " |
| n | Y18 | – " " " |
| o | * | – SEPARATION SIGN |

CHARACTER LIST

V = STAGGER VALUE
H = PRINT HEAD HEIGHT

COMPRESSED INFORMATION STORAGE FOR CHARACTERS CONSISTING OF BLACK AND WHITE AREAS WHICH ARE TO BE DISPLAYED OR PRINTED

BACKGROUND OF THE INVENTION

1. Field of the Invention

The invention relates to the compressed information storage of characters consisting of black and white areas which are to be displayed or printed, and more particularly to apparatus for decompressing stored compressed character information.

2. Description of the Prior Art

Several prior arrangements are known for the output of characters made up of black and white areas. In computer controlled alpha-numeric character generators, the characters are initially stored in an encoded form to be subsequently converted by means of decoders into graphical information for character output. The more sophisticated arrangements are able to handle characters of different fonts and sizes. To this end storages are required which contain the information necessary for displaying or printing the various characters. For each character of a particular size and font, font storages contain specific information for controlling the output of the character. However, for large amounts of data, i.e., for applications involving a plurality of different character sizes and fonts, the size of the font storages becomes excessive. Previously, for cost reasons, attempts were made to keep the size of such storages as small as possible. To achieve this, the amount of data required for character output was reduced with the aid of compressed information storage. A known method of this kind is known as "run length coding," whereby compression is effected by storing the length data of the black and white areas of the characters divided into columns. See U.S. Pat. No. 3,582,905, Character Generation by Improved Scan, Storage, and Decoding Apparatus, H. P. Kraatz et al., filed Jan. 13, 1969, issued June 1, 1971, and assigned to IBM.

However, this method did not solve the problem of character staggering wherein characters are above or below the print line, and did not permit the output of characters over several lines.

SUMMARY OF THE INVENTION

Therefore, it is a primary object of the invention to provide improved data compression for characters to be displayed or printed.

It is also an object of this invention to provide for compression which saves storge space and which permits characters to be readily staggered and larger characters to be displayed or printed over several lines.

These objects are accomplished in accordance with the invention by splitting a character into columns. Positional values of the respectively white/black and black/white transitions are stored for each column, as referred to a coordinate common to all columns. For adjacent columns of identical contents, only the positional values of one of these columns and the number of columns identical to it are stored. In accordance with an aspect of the invention, the coordinate common to all columns is chosen in such a manner that the first positional value to be stored for a column is associated with a white/black transition.

This invention simplifies decompressing the stored compressed character information because a character is displayed or printed column-by-column in such a manner that the black areas extend from the first to the second, the third to the fourth, the fifth to the sixth, etc., positional transition value of a column.

It is therefore a further object of the invention to provide an apparatus for decompressing data in connection with the column serial output of a character on a write or print unit activated by control signals.

The above object is accomplished in accordance with the invention by providing a storage with compressed character information and a position register to successively accommodate the positional values of the respectively black/white and white/black transitions in a character column. A decoder circuit, following the position register and comprising a number of outputs corresponding to the number of positional values possible, is provided which actuates the respective output associated with a transition value. The decoder circuit is followed by a generator to generate the control signals for continuous black areas in a column, extending from transition value to transition value.

A particularly simple and effective control of the generator for generating the control signal for continuous black areas is obtained by means of a flip-flop.

In accordance with another aspect of the invention, it is advantageous for a character stagger, i.e., a variable distance at which a character is spaced from the base line, to be taken into account. A computer controlled stagger register is provided for this purpose. The stagger register contents, the stagger value, are linked to the contents of the position register via an adder preceding the decoder circuit. A further feature of the invention concerns a repetition factor counter, for storing the number of adjacent identical character columns, which is connected to the storage and controls a print register (W-register). In accordance with the invention, the generator is controlled via the control flip-flop in such a manner that the flip-flop for displaying or printing a character a. supplies a constant output signal for a character positioned within an assumed line height and b. can be switched by results $\leq 0$ formed in the adder for a character stagger exceeding the assumed line height or for the multi-line output of a character > the assumed line height.

The generator for generating all control signals consists of EXCLUSIVE-OR circuits supplying control signals. The input signals to each EXCLUSIVE-OR are associated with the outputs of the decoder circuit. The second input of the EXCLUSIVE-OR for the lowest positional transition value possible is connected to the output signal of the control flip-flop, and the output of each EXCLUSIVE-OR circuit simultaneously forms the second input of the EXCLUSIVE-OR circuit with the next higher positional transition value possible.

Negative printing of a character is simply accomplished by inverting the flip-flop output.

The invention can be employed to particular advantage in electroerosive, photo-optical, and thermal printers, in plotters or electron beam write units. It is also suitable for the direct production of nylon printing plates by means of an optical illumination (write) process, for the direct manufacture of offset foils by the electroerosion of zinc plates, and many other applications. The print unit may advantageously take the form of a metal paper printer with a print head movable in the direction of print and electrodes disposed orthogonally to the direction of print and which are energized by means of the associated control signals.

The foregoing and other objects, features and advantages of the invention will be apparent from the following more particular description of a preferred embodiment of the invention as illustrated in the accompanying drawings.

DESCRIPTION

The following description of a preferred embodiment is for compressed information storage of characters or symbols consisting of black and white areas which are to be displayed or printed. Of course, the terms black and white are understood to cover any equivalent representation of a symbol by the presence or absence of appropriate identifying indicia.

The characters are to be displayed or printed column-by-column. Independent of the print or write unit used, each position within the column must be identified by a corresponding control signal for a mark or a non-mark or by blanking and unblanking, respectively. For the purpose of this description it is assumed that the print unit is a metal paper printer in which the characters are displayed or printed by means of a print head movable in the direction of print and made up of electrodes arranged one above the other in a column. These electrodes are energized by associated control lines. As one of the electrodes is activated, a print-out corresponding to the electrode surface is produced on the part of the metal paper underneath the electrode. However, other print or write units which write or print as a function of control signals necessary for generating the column information are equally suitable.

Figure 1:
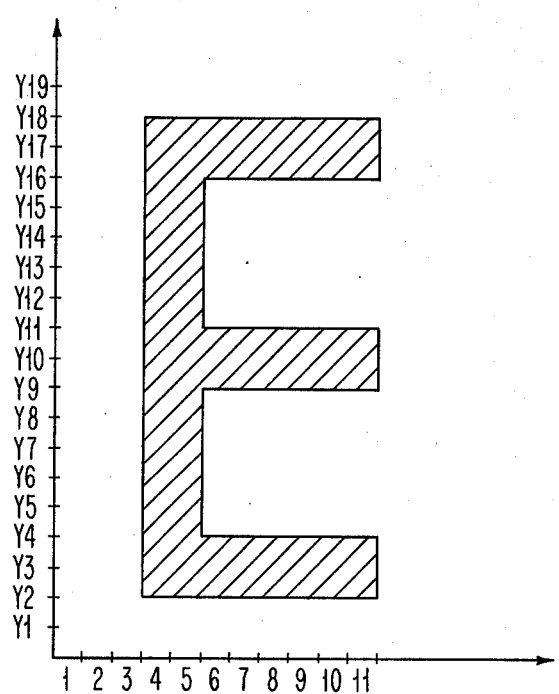
FIG. 1 is a representation of characters consisting of black and white areas which are to be displayed or printed.

In the case of rectangular or square electrode surfaces, the letter E can be made up of suitably positioned black and white areas in accordance with FIG. 1. The information necessary for the output of such a character must have been previously stored in some manner. In the present case the information is stored in compressed form, so that the character is split up into assumed equidistant vertical columns and that for each column, as referred to an abscissa common to all columns, the ordinates of the white/black or black/white transitions are stored. For adjacent columns of identical contents merely the ordinate values of the respectively white/black and black/white transitions for one of these columns and the number of identical columns are stored. The abscissa common to all columns is positioned in such a manner that the first transition coordinate value to be stored for a column is associated with a white/black transition.

For the schematically represented character E in FIG. 1 the following values are stored in accordance with the ascending order of the column numbers: The information $a = 15$ concerns the length of the list of the data to be stored for the letter E. To this end it is assumed that one data field is required for each value. Thus, inclusive of the information $a$, 15 fields are required for storing the character E. The second value $b$ indicates the number of successive identical columns. In this case the value 3 is specified under $b$, since the first three columns have the same contents. There are no black/white or white/black transitions in these first three columns 1, 2 and 3, so that no transition coordinates have to be specified. With the transition to column 4, whose contents differ from those of the preceding columns 1, 2 and 3, a separation sign * is specified under $c$. This is followed under $d = 2$ by the number of columns of the same contents, since the contents of columns 4 and 5 are identical. Then the ordinate values of the respectively white/black and black/white transitions are specified for these columns. Under $e$ the ordinate value $y_2$ is stored and under $f$ the ordinate value $y_{18}$ is stored, since at these positions there are transitions from white to black and from black to white areas, respectively. This information is to be interpreted in such a manner that ordinate value $y_{18}$, for example, is associated with the 18th print head electrode which extends in a vertical direction from the $y_{17}$ to the $y_{18}$ value and has a width of 1 column. The separation sign * under $g$ indicates a transition to a new column or to new columns with a content differing from those of column 5. As this is followed by six columns (6-11) of identical contents, the repetition factor 6 is stored under $h$, followed by the ordinate values for the white/black and the black/white transitions, respectively, in this instance $y_2$, $y_4$, $y_9$, $y_{11}$, $y_{16}$ and $y_{18}$.

The list for storing the information necessary for one letter is made up as follows: the first value indicates the length of the list, followed by what is known as the repetition factor indicating the number of successive columns of the same contents. This, in turn, is followed by the ordinate values for the white/black and the black/white transitions, respectively. The transition to a new column having a content other than those of the preceding columns is marked by a separation sign; this is again followed by the repetition factor and corresponding transition coordinate values, etc.

The information to be stored for a character is referred to as a list. The length of the lists for the various characters differs. Identical characters of different sizes each require one list. The possibility of having available different lists, depending upon the font and size of the letters used, permits the output of an image differentiated according to the different letter sizes and fonts.

Figure 2:
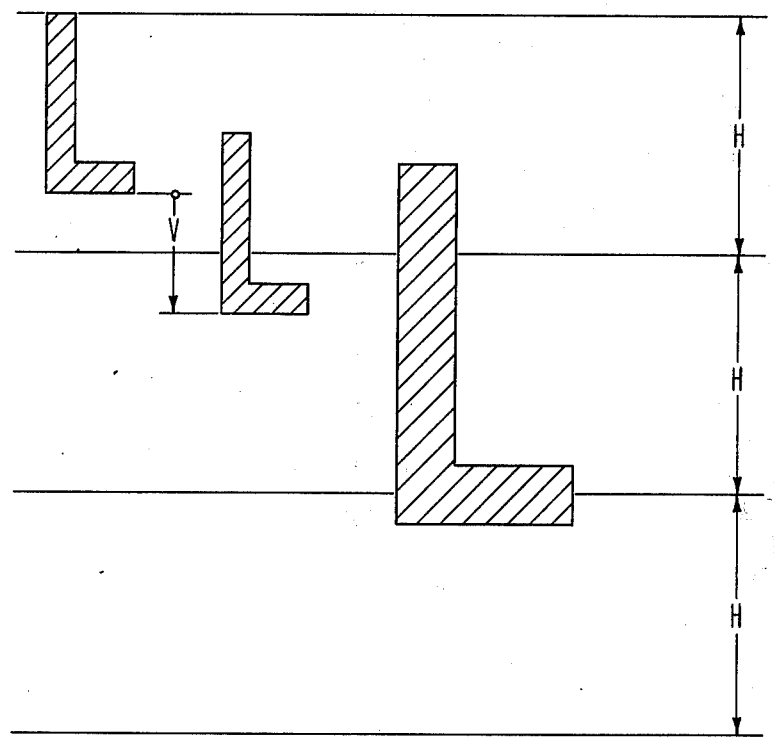
FIG. 2 is a representation of character stagger and the multi-line character output, wherein the character exceeds the line height.

As a character is displayed or printed it must be possible to consider a character stagger. FIG. 2 shows that the print process within a line is subject to the height of the electrode print head H. The characters are displayed or printed column serially line-by-line. FIG. 2 shows three lines, one arranged below the other. In the case of character stagger, i.e., a variable distance between a character and an assumed base line, a stagger value $v$ (which is either positive for an upward stagger or negative for a downward stagger) governs the new image pattern of the staggered character. In the example shown in FIG. 2 the character L is staggered downwards by the value $v$. Thus the staggered character L would have to be displayed or printed in separate print processes for the first and the second line.

In addition, it is possible to display or print characters having a height greater than the electrode print head. In the case of FIG. 2 the capital letter L (on the far right), stored in accordance with the process described in connection with FIG. 1, is displayed or printed in three successive lines, taking into account a possible character stagger. The difficulty in displaying or printing a character extending over several print head heights is in the determination of the black areas within the various lines. This is described in greater detail in connection with FIG. 3.

Figure 3:
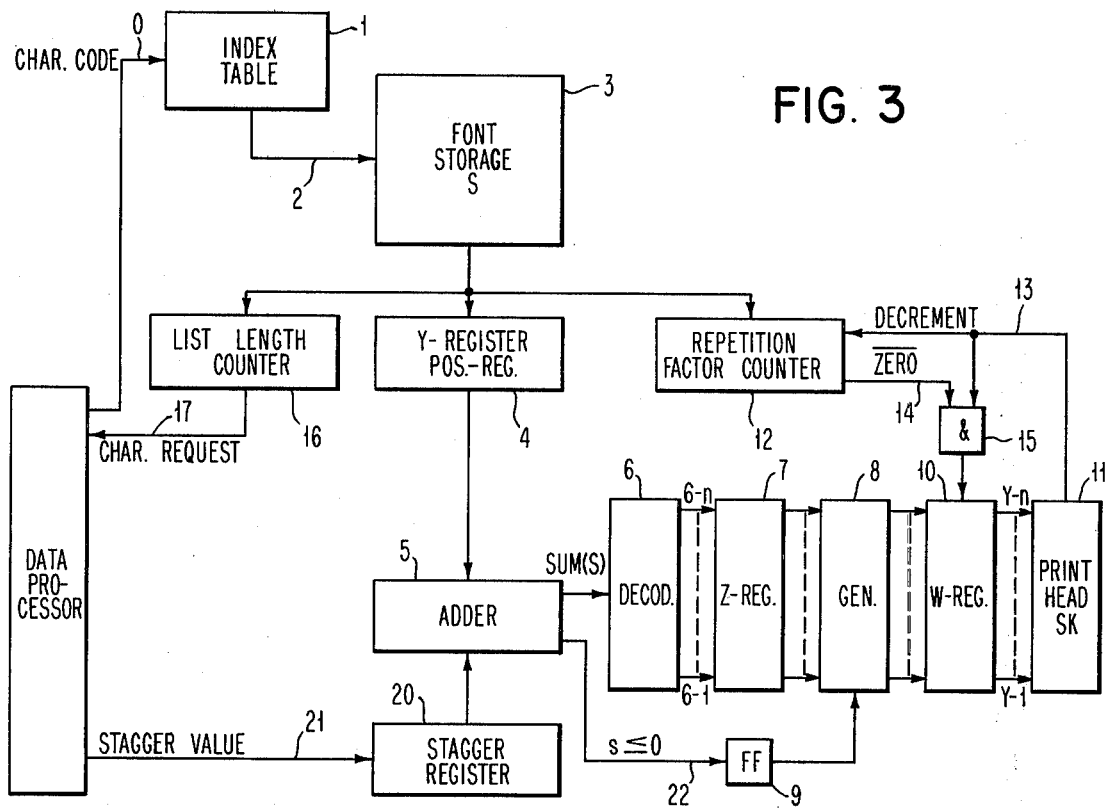
FIG. 3 is a block schematic diagram of a preferred embodiment of the invention.

FIG. 3 shows a block diagram of a circuit for the decompression of data stored in connection with compressed character information lists in accordance with FIG. 1.

All lists for characters of different sizes and fonts are stored in the font storage 3. The individual character lists are addressed via a character code on line 0, in order to invoke an index table 1 containing the address of the required list of the corresponding character in font storage 3. Index table 1 is connected to font storage 3 via line 2. The transition coordinate values for the first character column are consecutively read from font storage 3 into Y-register 4, whence they are transferred, via adder 5, into decoder circuit 6. The number of outputs 6-1 to 6-$n$ of this decoder circuit 6 corresponds to the number of print head electrodes arranged one above the other. These outputs are associated with the electrodes of the print head. The number of outputs provided for also corresponds to the number of coordinate values possible within the height of the print head. By means of the decoder circuit, output lines are activated for each line which correspond to the respective coordinate values of the black/white or the white/black transitions within the height of the print head. Output lines 6-1 to 6-$n$ are connected to a Z-register 7 in which the status of the various output lines is stored.

The Z-register 7 is followed by a generator 8. Generator 8 has the same number of output lines as decoder circuit 6 and Z-register 7, respectively. Generator 8 serves to predetermine continuous black areas, in order to activate the appropriate output lines for controlling the corresponding print head electrodes. It is assumed in connection with FIG. 1 that print head 18 comprises electrodes ($y_1$ to $y_{18}$) which are arranged one above the other. Accordingly, decoder circuit 6 comprises 18 different output lines to control these electrodes, and the Z-register for storing the status of these output lines has 18 different stages. Decoder 6, for example, marks the second and the 19th output line for the fourth column of character E, and generator 8 activates all output lines from output line 3 through 18, so that the print head could finally print the continuous black area in column 4 of letter E, extending from the third through the 18th electrode.

Generator 8 is also controlled via a flip-flop 9 whose function will be described in greater detail in connection with FIG. 4.

Generator 8 is followed by a register 10 for storing the status of the input and output lines of generator 8. From register 10 the control lines ($y_1, Y_2, \ldots Y_n$) for the electrodes of print head 11 are energized.

A counter 12 for the repetition factor is also connected to the output of font storage 3. Printing is effected column serially line-by-line. The number of successive characters of the same contents is indicated by the repetition factor. In the example of FIG. 1 the repetition factor for the first three columns (of the same contents) thus is 3. This value 3 is fed to counter 12 whose contents are decremented by 1 as a column is displayed or printed. The information required for this purpose is supplied by print head 11 to counter 12 via line 13. Via output line 14, which together with line 13 leads up to an AND circuit 15, counter 12 supplies an output signal to register 10 as long as the contents of this counter 12 are greater than 0. Thus a multi-column output of the same contents, based on the information stored in register 10, is obtained. When a counter value of 0 has been reached, the reading of new data from font storage 3 is initiated. For the next line to be displayed or printed the electrodes are controlled in the same manner as previously described.

Also connected to font storage 3 is a counter 16 for the length of the list. As a list value is read from font storage 3 (including the list length value), the contents of counter 16 are decremented by 1. After all list data have been processed, this counter has a value of 0, which causes a fresh character to be requested via line 17. The request signal is fed to a computer which, via line 0, emits the code for the next character to be displayed or printed, thus initiating the fetching of a new list from the font storage.

The arrangement previously described also permits characters to be printed backwards, so that printing can also be effected during the return of the print unit. To this end the list in font storage 3 is read backwards, which is possible after the address has been correspondingly modified (as a function of the character code). When such a list has been read backwards, the repetition factor will be in front of the separation sign. For backward reading, the length value also appears at the end of the respective list. This eliminates reading out the length data at the beginning of the list.

Figure 4:
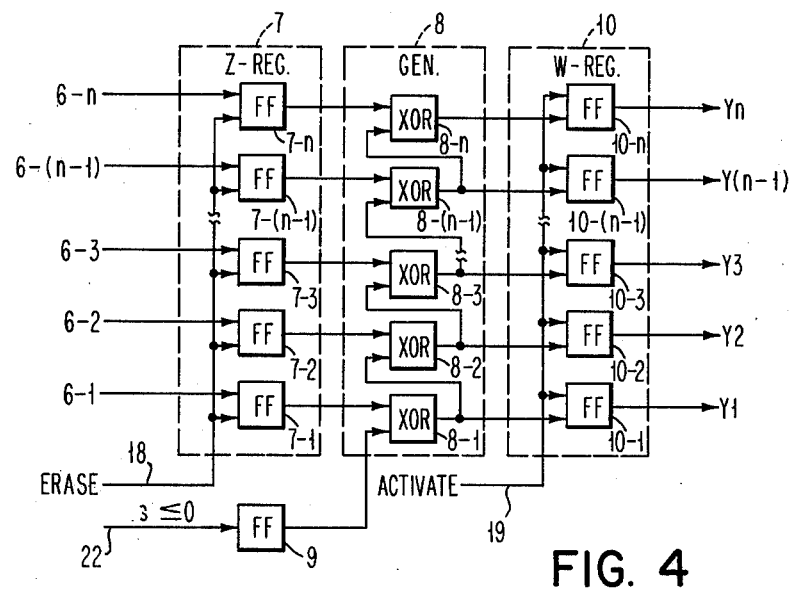
FIG. 4 is a detailed circuit diagram of the Z-register, the generator and the W-register (write register) shown in FIG. 3.

FIG. 4 shows details of Z-register 7 with the connected generator 8 and write register 10. The Z-register 7 comprises a number of bistable circuits 7-1 to 7-$n$ corresponding to the number of electrodes on the print head. Each of these bistable circuits has two inputs. The first input is formed by the appropriate output line 6-1 to 6-$n$ of decoder 6. The second input is common to the various bistable circuits and is driven by an erase line 18. As a signal occurs on one of the output lines 6-1 to 6-$n$ of decoder 6, the corresponding biastble circuit is set (until an erase pulse occurs on line 18). Each output line of the bistable circuits of register 7 links up with an exclusive OR (XOR) circuit 8-1 to 8-$n$ of generator 8. An exclusive OR circuit generates a positive output only when the inputs are unequal. The XOR circuits of generator 8 are connected in such a manner that the control signals for the electrodes of the print head appear on their outputs. These outputs are connected to a bistable circuit 10-1 to 10-$n$ of write register 10, whose common second input serves to activate bistable circuits 10-1 to 10-$n$ via line 19. The XOR circuits of generator 8 are connected so that the second input of XOR circuit 8-1 is connected to the output of control flip-flop 9 for the lowest coordinate value possible and that the output of each of the other XOR circuits 8-1 to 8-($n$-1) simultaneously forms the second input of the XOR circuit with the next higher coordinate value possible. For a write process during which the character height does not exceed the height of the print head all transition coordinate values are positive. For this case control flip-flop 9 is not set, i.e., it does not generate an output signal. For the fourth column of character E to be displayed or printed in accordance with FIG. 1 the decoder supplies an output signal on lines 6-3 and 6-19. This causes bistable circuits 7-3 and 7-19 to be set in Z-register 7. XOR circuits 8-1 and 8-2 remain without input pulses, and XOR circuit 8-3 similar to XOR circuit 8-19 receives an input pulse. However, this leads to XOR circuit 8-3 forming an output pulse which is applied as an input pulse to XOR circuit 8-4. An output pulse thus produced again acts as an input pulse on XOR circuit 8-5, etc. In this manner output pulses are supplied by all XOR circuits 8-3 to 8-18, (the pulse inhibited from propagation beyond 8-18 by the fact that input 6-19 is energized) whereby these pulses set bistable circuits 10-3 to 10-18 of register 10, so that the black area in column 4 extending from the third through the 18th electrode is displayed or printed.

To accommodate character stagger, the arrangement of FIG. 3 comprises a stagger register 20, an adder 5, and a control flip-flop 9 for generator 8. Character stagger may be necessary for two reasons:

1. The character to be printed, which is equal to the height of the print head, is to be staggered in such a manner that its upper part is printed during the printing process of one line, whereas the lower part is printed during the printing process of the subsequent line.
2. The character to be printed exceeds the height of the print head so that it cannot be printed during a single one-line printing process.

This necessitates that the characters be printed in several line runs. The character stagger is taken into account as follows by the circuit of FIG. 3. Via line 21, the stagger value V is set in stagger register 20 under the control of the data processor. From the stagger register the value is transferred to adder 5 where it is added to the actual transition coordinate value from register 4. If the result of this addition is $s \leq 0$, this negative result causes a pulse to be applied to control flip-flop 9 via line 22. The output of flip-flop 9 thus produced acts to control generator 8 to energize the low order XOR position. This indirectly results in an input pulse to the next higher order XOR, and so on. Decoder circuit 6 is designed in such a manner that control lines 6-1 to 6-$n$ are energized as a function of the computed addition values. This is particularly relevant when for the multiline printing of a character or for a stagger in excess of one line the values computed in the adder have to be converted for application to the output lines for controlling the print head. The function of control flip-flop 9, as described, serves to determine whether an area marked by an upper transition coordinate value as still falling within the boundaries of a line, is to be continued as a black area in the direction of the subsequent line or not. This is explained by means of the following example.

Assuming character E in accordance with FIG. 1 is to be staggered downwards by 5 values. The stagger value would thus be $-5$, and the output of the character would extend to two print lines. The upper transition coordinate value $y_{18}$ would be added to the stagger value $-5$. The result of this would be a new transition ordinate value of $18 - 5 = 13$, provided that $y_{18}$ equals 18. However, on its own this value does not indicate whether the area extending from the base line to the new transition coordinate value 13 in the first print line is a continuous black area or not. Information on this can be obtained by forming the transition coordinate value assumed to fall within the second line and which is obtained by adding the storage value to $y_2$ ($y_2 = 2$ assumed value) $2 - 5 - 3$. This value is negative and serves to turn on control flip-flop 9. From the function of control flip-flop 9 and generator 8 described in connection with FIG. 4, it can be seen that the output signal of control flip-flop 9 results in the first print line to be in a black area extending from the base line to transition coordinate value 13 (for column 4).

As the second line is printed to handle the remainder of character E in column 4, (i.e., that part of the character which is below the print line) decoder circuit 6 automatically ensures that the associated output line ($n$-3) is energized for the new $y_2$ transition coordinate value of $-3$, as indicated above.

Generator 8 is designed in such a manner that a negative print can be readily generated. It is merely necessary to inversely initialize flip-flop 9, i.e., to inverse the output status of the control flip-flop.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A symbol generating apparatus for generating symbols from data stored in a storage wherein symbols represented by black and white areas are stored in compressed form by the symbol being divided into columns and rows, row positional values in each column for white/black and black/white transitions being stored for each column, the positional values being referred to a coordinate common to all columns, said apparatus comprising:

registering means associated with the storage for registering the row positional values of white/black and black/white transitions;

decoder means having a number of outputs corresponding to a predetermined number of positional values, said decoder means being responsive to the registered row positional values for energizing the outputs associated with each transition value;

control means having a number of control outputs corresponding to the predetermined number of positional values, said control means responsive to the energized outputs of said decoder means for generating control signals corresponding to all positional values between each white/black transition and black/white transition;

means for coupling said control signals to energize a utilization device; and means for generating a control signal operable to register subsequent row positional values of white/black and black/white transitions whereby the utilization device is operable to reconstruct a symbol column-by-column.

2. The combination according to claim 1 wherein said control means comprises:

a plurality of exclusive -OR circuits, one exclusive -OR corresponding to each row positional value; one input of each exclusive -OR connected to receive an output from the corresponding positional value output of said registering means; and the other input of each exclusive -OR connected to the output of the exclusive -OR in a lower order adjacent row;

whereby the energized outputs of said decoder means causes an output from the exclusive -OR in the same row position and an output from the exclusive -OR in the higher order adjacent row.

3. The combination according to claim 2 further comprising:

a control trigger, and means connecting the other input of the exclusive -OR corresponding to the lowest order row position, (which has no lower order adjacent row to which connection is made) to the output of said control trigger, whereby energization of said control trigger causes a negative representation of said symbol to be generated.

4. The combination according to claim 3 further comprising:

means for registering a stagger value;

adding means connected between said decoder means and said control means;

means to control said adding means to add the stagger value to the row positional values stored in said registering means, to thereby shift the energized outputs associated with each transition value.

5. The combination according to claim 4 wherein said adding means includes means for generating an output when the results of an addition are $\leq 0$, said output connected to energize said control trigger, whereby the appropriate transition level to produce a symbol below the common reference coordinate is set in said trigger.

* * * * *